US012078959B2

(12) United States Patent
Tomita et al.

(10) Patent No.: US 12,078,959 B2
(45) Date of Patent: Sep. 3, 2024

(54) METHOD FOR PRODUCING TONER FOR DEVELOPING ELECTROSTATIC CHARGE IMAGE, AND TONER FOR DEVELOPING ELECTROSTATIC CHARGE IMAGE

(71) Applicant: FUJIFILM Business Innovation Corp., Tokyo (JP)

(72) Inventors: Daisuke Tomita, Kanagawa (JP); Hiroshi Nakazawa, Kanagawa (JP); Yuji Isshiki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 182 days.

(21) Appl. No.: 17/465,996

(22) Filed: Sep. 3, 2021

(65) Prior Publication Data

US 2022/0308483 A1 Sep. 29, 2022

(30) Foreign Application Priority Data

Mar. 23, 2021 (JP) ................................. 2021-049120

(51) Int. Cl.
*G03G 9/08* (2006.01)

(52) U.S. Cl.
CPC ......... *G03G 9/0815* (2013.01); *G03G 9/0804* (2013.01); *G03G 9/0821* (2013.01)

(58) Field of Classification Search
None
See application file for complete search history.

(56) References Cited

U.S. PATENT DOCUMENTS

| | | | | |
|---|---|---|---|---|
| 9,804,519 | B2 | 10/2017 | Suzumura et al. | |
| 9,846,379 | B2 | 12/2017 | Onishi et al. | |
| 2007/0148576 | A1 * | 6/2007 | Ishiyama | G03G 9/0804 430/108.1 |
| 2017/0160656 | A1 * | 6/2017 | Suzumura | G03G 9/0804 |

FOREIGN PATENT DOCUMENTS

| | | | | |
|---|---|---|---|---|
| JP | 2010-020303 | A | 1/2010 | |
| JP | 2015075764 | A * | 4/2015 | G03G 9/0804 |
| JP | 2015175938 | A * | 10/2015 | |
| JP | 2017-107180 | A | 6/2017 | |
| JP | 2017-111201 | A | 6/2017 | |
| JP | 2018-013589 | A | 1/2018 | |
| JP | 2018-193493 | A | 12/2018 | |

OTHER PUBLICATIONS

JP-2015175938-A Translation (Year: 2023).*
JP-2015075764-A Translation (Year: 2023).*

* cited by examiner

*Primary Examiner* — Peter L Vajda
*Assistant Examiner* — Charles Collins Sullivan, IV
(74) *Attorney, Agent, or Firm* — Sughrue Mion, PLLC

(57) ABSTRACT

A method for producing a toner for developing an electrostatic charge image includes aggregating at least resin particles and releasing agent particles contained in a dispersion to form aggregated particles; heating and fusing the aggregated particles to prepare a dispersion containing fused particles; and cooling the dispersion containing the fused particles to a temperature equal to or lower than a temperature 30° C. lower than an endothermic peak onset temperature derived from a releasing agent that constitutes the releasing agent particles, in which, in the cooling, the dispersion is cooled at a rate of 30° C./min or more and 130° C./min or less.

11 Claims, 2 Drawing Sheets

METHOD FOR PRODUCING TONER FOR DEVELOPING ELECTROSTATIC CHARGE IMAGE, AND TONER FOR DEVELOPING ELECTROSTATIC CHARGE IMAGE

CROSS-REFERENCE TO RELATED APPLICATIONS

This application is based on and claims priority under 35 USC 119 from Japanese Patent Application No. 2021-049120 filed Mar. 23, 2021.

BACKGROUND

(i) Technical Field

The present disclosure relates to a method for producing a toner for developing an electrostatic charge image, and a toner for developing an electrostatic charge image.

(ii) Related Art

Image information visualizing methods, such as electrophotography, are presently used in various fields. In electrophotography, an electrostatic charge image is formed as image information on a surface of an image carrying body by charging and forming an electrostatic charge image. Then a toner image is formed on the surface of the image carrying body by using a developer that contains a toner, and, after the toner image is transferred onto a recording medium, the toner image is fixed onto the recording medium. Through these steps, image information is visualized into an image.

For example, Japanese Unexamined Patent Application Publication No. 2018-193493 discloses a method for producing a dispersion of acid group-containing resin particles by a phase inversion emulsification method including the following steps:

Step 1: A step of preparing a solution by mixing an acid group-containing resin and an organic solvent.

Step 2: A step of obtaining a neutralized mixed solution having a liquid viscosity of 100 to 1000 mPa·s, the step involving adding and mixing a neutralizer to the solution obtained in step 1.

Step 3: A step of obtaining an emulsion of acid group-containing resin particles, the step involving, after the liquid viscosity of the neutralized mixed solution obtained in step 2 is confirmed, adding water to 100 parts by mass of the acid group-containing resin at a rate of 0.5 to 50 parts by mass per minute.

Step 4: A step of obtaining a dispersion of the acid group-containing resin particles by removing the organic solvent from the emulsion obtained in step 3.

Japanese Unexamined Patent Application Publication No. 2010-20303 discloses a method for producing a developer, the method including a step of preparing a dispersion of fine particles containing a binder resin and a coloring agent and having a first particle diameter; a step of aggregating the fine particles to form aggregated particles having a second particle diameter larger than the first particle diameter; and a step of forming toner particles by using the aggregated particles, in which an inverting agent that inverts the sign of the zeta potential of the fine particles is added during or before the aggregating step to invert the sign of the zeta potential of the fine particles.

Japanese Unexamined Patent Application Publication No. 2017-111201 discloses a method for producing a toner, the method including: a first step of heating a dispersion, which contains an aqueous medium and toner base particles generated by aggregating and fusion-bonding fine particles of a binder resin containing a crystalline resin, to a temperature equal to or higher than the melting point of the crystalline resin; a second step of cooling the dispersion heated in the first step and having a temperature higher than a recrystallization temperature Rc of the crystalline resin to a temperature lower than the Rc at a temperature decrease rate of 1° C./min or more; and a third step of retaining the dispersion cooled in the second step at a temperature equal to or higher than the temperature 25° C. lower than the Rc and equal to or lower than the temperature 5° C. lower than the Rc for 30 minutes or longer.

Japanese Unexamined Patent Application Publication No. 2018-13589 discloses a method for producing a toner for developing an electrostatic charge image, the method including: step (1) of aggregating an amorphous hybrid resin and a crystalline resin in an aqueous medium to obtain a dispersion of aggregated particles; step (2) of fusion-bonding the obtained aggregated particles to obtain a dispersion of fusion-bonded particles; and step (3) of cooling the obtained dispersion of the fusion-bonded particles at a rate of 10° C./min or more, in which the amorphous hybrid resin includes a polyester resin segment and a vinyl resin segment that contains a constituting unit derived from a vinyl monomer having a hydrocarbon group having 6 or more and 22 or less carbon atoms.

Japanese Unexamined Patent Application Publication No. 2017-107180 discloses a method for producing a toner that includes toner particles containing a binder resin, a coloring agent, and a crystalline substance, the method including: step (I) of adjusting the temperature of a dispersion containing the binder resin, the coloring agent, and coloring particles containing the crystalline substance dispersed in an aqueous medium, to a temperature $T_A$ (° C.) which is higher than the higher one selected from a crystallization temperature Tc (° C.) of the crystalline substance and a glass transition temperature Tg (° C.) of the coloring particles; step (II) of cooling the dispersion subjected to step (I) from the temperature $T_A$ to a temperature equal to or lower than the Tg (° C.) at a rate of 5.0° C./min or more; and step (III) of retaining the dispersion subjected to step (II) in a temperature range of Tg−10° C. or more and Tg+10° C. or less for 30 minutes or longer.

SUMMARY

Aspects of non-limiting embodiments of the present disclosure relate to a method for producing a toner for developing an electrostatic charge image, the toner having an excellent property of suppressing occurrence of color spots in the obtained image compared to a method for producing a toner for developing an electrostatic charge image, the method including aggregating at least resin particles and releasing agent particles contained in a dispersion to form aggregated particles; heating and fusing the aggregated particles to prepare a dispersion containing fused particles; and cooling the dispersion containing the fused particles to a temperature equal to or lower than a temperature 30° C. lower than an endothermic peak onset temperature derived from a releasing agent that constitutes the releasing agent particles, in which, in the cooling, the dispersion is cooled at a rate of less than 30° C./min or more than 130° C./min.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a method for producing a toner for developing an electrostatic charge image, the method including: aggregating at least resin particles and releasing agent particles contained in a dispersion to form aggregated particles; heating and fusing the aggregated particles to prepare a dispersion containing fused particles; and cooling the dispersion containing the fused particles to a temperature equal to or lower than a temperature 30° C. lower than an endothermic peak onset temperature derived from a releasing agent that constitutes the releasing agent particles, in which, in the cooling, the dispersion is cooled at a rate of 30° C./min or more and 130° C./min or less.

BRIEF DESCRIPTION OF THE DRAWINGS

Exemplary embodiments of the present disclosure will be described in detail based on the following figures, wherein.

DETAILED DESCRIPTION

Figure 1:
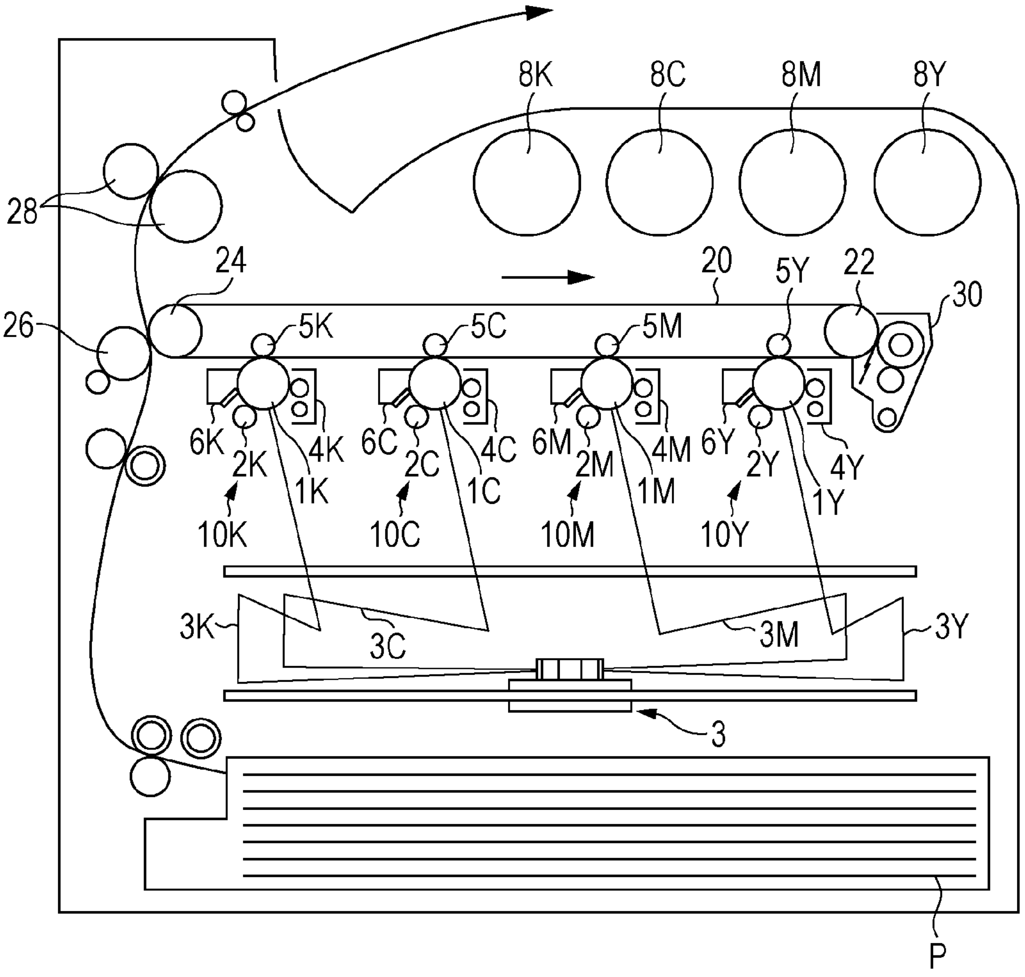
FIG. 1 is a schematic diagram illustrating one example of an image forming apparatus according to an exemplary embodiment.

Hereinafter, exemplary embodiments, which are some examples of the present disclosure, are described in detail.

When numerical ranges are described stepwise, the upper limit or the lower limit of one numerical range may be substituted with an upper limit or a lower limit of a different numerical range also described stepwise.

In any numerical range, the upper limit or the lower limit of the numerical range may be substituted with a value indicated in Examples.

When multiple substances that correspond to a particular component in a composition are present in the composition, the amount of that component in the composition is the total amount of the multiple substances present in the composition unless otherwise noted.

The term "step" refers not only to an independent step but also to any feature that attains the intended purpose of the step even if this feature is not clearly distinguishable from other steps.

Method for Producing Toner for Developing Electrostatic Charge Image

A method for producing a toner for developing an electrostatic charge image according to an exemplary embodiment includes an aggregation step of aggregating at least resin particles and releasing agent particles contained in a dispersion to form aggregated particles; a fusing step of heating and fusing the aggregated particles to prepare a dispersion containing fused particles; and a cooling step of cooling the dispersion containing the fused particles to a temperature equal to or lower than a temperature 30° C. lower than an endothermic peak onset temperature derived from a releasing agent that constitutes the releasing agent particles, in which, in the cooling, the dispersion is cooled at a rate of 30° C./min or more and 130° C./min or less.

A toner for developing an electrostatic charge image according to an exemplary embodiment is a toner produced by the method for producing the toner for developing an electrostatic charge image of the aforementioned exemplary embodiment.

Since wet-process toners have a narrow particle size distribution and are nearly spherical, charge uniformity is high, and thus wet-process toners have become the main production method for manufacturers. In particular, an emulsification aggregation method offers excellent shape controllability. From the viewpoint of energy conservation, productivity, and improved low-temperature fixing performance, manufacturers have added a releasing agent to the inside of the toner to obtain the fixing releasability. However, the presence of the releasing agent between toner particles during the aggregation and coalescence has caused the releasing agent particles to fuse to each other and form coarse toner particles. These coarse particles sometimes generate color spots in an image that is being formed.

In existing methods, attempts to suppress coarsening of particles have been made by making the particle size distribution of the raw material resin particles sharp (Japanese Unexamined Patent Application Publication No. 2018-193493) and by causing the particles to electrically repel each other (Japanese Unexamined Patent Application Publication No. 2010-20303); however, these methods rarely suppress coarsening of particles caused by fusion-bonding via the releasing agent, and suppression of the coarsening of the particles has been insufficient.

The method for producing a toner for developing an electrostatic charge image according to this exemplary embodiment includes a cooling step of cooling the dispersion containing fused particles to a temperature equal to or lower than a temperature 30° C. lower than the endothermic peak onset temperature derived from the releasing agent. In this cooling step, the dispersion is cooled at a rate of 30° C./min or more and 130° C./min or less, and this presumably prevents toner particles from becoming fused to each other via the releasing agent near the surfaces of the toner particles, suppresses generation of coarse particles, and offers an excellent property of suppressing occurrence of color spots in the obtained image.

The method for producing a toner for developing an electrostatic charge image according to this exemplary embodiment involves forming toner particles by an aggregation and coalescence method.

In addition, the toner particles can be core-shell-type toner particles.

Hereinafter, steps other than those described above are described in detail.

Aggregation Step

The method for producing a toner for developing an electrostatic charge image according to this exemplary embodiment includes an aggregation step of aggregating at least resin particles and releasing agent particles contained in a dispersion to prepare aggregated particles.

The dispersion in this aggregation step contains at least the resin particles and the releasing agent particles. If needed, the dispersion may further contain coloring agent particles and the like.

The method for preparing the dispersion is not particularly limited, and, for example, the dispersion can be prepared by mixing a resin particle dispersion and a releasing agent particle dispersion.

In the dispersion, at least the resin particles and the releasing agent particles are aggregated to prepare a dispersion containing aggregated particles.

Specifically, for example, the aggregation involves adding an aggregating agent to the dispersion, adjusting the pH of the dispersion to acidic (for example, a pH of 2 or more and 5 or less), adding a dispersion stabilizer as needed, and heating the resulting mixture to a temperature corresponding to the glass transition temperature of the resin particles (specifically, for example, a temperature 30° C. to 10° C. lower than the glass transition temperature of the resin particles) to aggregate the particles dispersed in the dispersion and to thereby form aggregated particles.

In the aggregation step, for example, the heating may be performed after the aggregating agent is added to the dispersion at room temperature (for example, 25° C.) under stirring with a rotary shear homogenizer, the pH of the dispersion is adjusted to acidic (for example, a pH of 2 or more and 5 or less), and a dispersion stabilizer is added as necessary.

Examples of the aggregating agent include a surfactant having an opposite polarity to a surfactant used as a dispersing agent added to the mixed dispersion, an inorganic metal salt, and a divalent or higher metal complex. In particular, when a metal complex is used as the aggregating agent, the amount of the surfactant used is decreased, and the charge properties are improved.

An additive that forms a complex or a similar bond to the metal ion in the aggregating agent may be used as needed. For example, a chelating agent can be used as this additive.

Examples of the inorganic metal salt include metal salts such as calcium chloride, calcium nitrate, barium chloride, magnesium chloride, zinc chloride, aluminum chloride, and aluminum sulfate, and inorganic metal salt polymers such as polyaluminum chloride, polyaluminum hydroxide, and calcium polysulfide.

Among these, an aluminum compound can be used as the aggregating agent.

The amount of the aggregating agent added is not particularly limited as long as aggregation is achieved, and is, for example, preferably 0.01 parts by mass or more and 5.0 parts by mass or less and more preferably 0.1 parts by mass or more and 3.0 parts by mass or less relative to 100 parts by mass of the resin particles.

A water-soluble chelating agent may be used as the chelating agent. Examples of the chelating agent include oxycarboxylic acids such as tartaric acid, citric acid, and gluconic acid, iminodiacetic acid (IDA), nitrilotriacetic acid (NTA), and ethylenediaminetetraacetic acid (EDTA).

The amount of the chelating agent added is, for example, preferably 0.01 parts by mass or more and 5.0 parts by mass or less and more preferably 0.1 parts by mass or more and less than 3.0 parts by mass relative to 100 parts by mass of the resin particles.

The dispersion used in the aggregation step is preferably a water-based dispersion and is more preferably a water dispersion.

Examples of the dispersion medium used in the dispersion in the aggregation step include water-based media.

Examples of the water-based media include water such as distilled water and ion exchange water, and alcohols. These may be used alone or in combination.

The dispersion used in the aggregation step can contain a surfactant.

Examples of the surfactant include anionic surfactants such as sulfate surfactants, sulfonate surfactants, phosphate surfactants, and soap surfactants; cationic surfactants such as amine salt surfactants and quaternary ammonium salt surfactants; and nonionic surfactants such as polyethylene glycol surfactants, alkyl phenol ethylene oxide adduct surfactants, and polyhydric alcohol surfactants. Among these, an anionic surfactant and a cationic surfactant are preferable. A nonionic surfactant may be used in combination with an anionic surfactant or a cationic surfactant.

These surfactants may be used alone or in combination.

The volume average particle diameter of the resin particles before aggregation dispersed in the dispersion is preferably 0.01 μm or more and 1 μm or less, more preferably 0.08 μm or more and 0.8 μm or less, and yet more preferably 0.1 μm or more and 0.6 μm or less.

The volume average particle diameter of the releasing agent particles before aggregation dispersed in the dispersion is preferably 0.01 μm or more and 1 μm or less, more preferably 0.08 μm or more and 0.8 μm or less, and yet more preferably 0.1 μm or more and 0.6 μm or less.

The volume average particle diameters of the resin particles and the releasing agent particles are each determined by using a particle size distribution obtained by measurement with a laser diffraction particle size distribution meter (for example, LA-700 produced by Horiba Ltd.), drawing a cumulative distribution with respect to volume from the small diameter size relative to the divided particle size ranges (channels), and assuming the particle diameter at 50% accumulation relative to all particles as D50v. The volume average particle diameters of other particles in the dispersion are also measured in a similar manner.

The resin particles in the aggregation step preferably contain polyester resin particles and more preferably are polyester resin particles from the viewpoints of the property of suppressing the surface exposure of the releasing agent, the thermal storage property, and the image density stability.

The resin particles in the aggregation step preferably contain amorphous resin particles and more preferably contain amorphous resin particles and crystalline resin particles.

As described above, the dispersion may further contain coloring agent particles used in the toner particles, and the like.

The volume average particle diameter of the coloring agent particles may be the same as that of the resin particles.

In the aggregation step, from the viewpoint of the dispersibility of the resin particles, the releasing agent particles, etc., the solid component concentration of the dispersion is preferably 5 mass % or more and 30 mass % or less, more preferably 8 mass % or more and 25 mass % or less, and yet more preferably 11 mass % or more and 20 mass % or less.

The volume average particle diameter of the aggregated particles obtained in the aforementioned aggregation step is not particularly limited, and can be appropriately selected according to the intended volume average particle diameter of the toner particles.

The aggregation may be terminated by any known method, such as increasing the pH. An example of the method for increasing the pH is addition of a basic compound. Examples of the basic compound are those described below in the pH adjusting step.

Specific examples of the basic compound include hydroxides of alkali metals such as lithium, sodium, and potassium, oxides and hydroxides of alkaline earth metals such as magnesium and calcium, ammonia, and amine compounds. From the viewpoints of the property of suppressing color spots in the obtained image and the property of suppressing fogging, hydroxides of alkali metals or alkaline earth metals are preferable, hydroxides of alkali metals are more preferable, potassium hydroxide and sodium hydroxide are yet more preferable, and sodium hydroxide is particularly preferable.

The basic compound is preferably added by preparing a water-based medium solution of the basic compound and more preferably by preparing an aqueous solution of the basic compound. Examples of the water-based medium are described below.

The individual components, such as a binder resin, a releasing agent, and a coloring agent, contained in the toner particles are described below.

Fusing Step

The method for producing a toner for developing an electrostatic charge image according to this exemplary embodiment includes a fusing step of heating and fusing the aggregated particles to form fused particles.

In the fusing step, a dispersion containing the dispersed aggregated particles is heated to a temperature equal to or higher than the glass transition temperature of the resin particles (for example, a temperature 30° C. to 50° C. higher than the glass transition temperature of the resin particles) and equal to or higher than the melting temperature of the releasing agent so as to fuse and coalesce the aggregated particles to thereby form toner particles.

In the fusing step, the resin and the releasing agent are in a compatibilized state at a temperature equal to or higher than the glass transition temperatures of the resin particles and equal to or higher than the melting temperature of the releasing agent. Subsequently, the resulting product is cooled to obtain toner particles.

Cooling Step

The method for producing a toner for developing an electrostatic charge image according to the exemplary embodiment includes a cooling step of cooling the dispersion containing the fused particles to a temperature equal to or lower than a temperature 30° C. lower than the endothermic peak onset temperature derived from the releasing agent, and, in the cooling step, the cooling rate is 30° C./min or more and 130° C./min or less.

In the cooling step described above, from the viewpoint of the property of suppressing occurrence of color spots in the obtained image, cooling is preferably performed at a rate of 40° C./min or more and 120° C./min or less and more preferably at a rate of 50° C./min or more and 80° C./min or less.

The method for producing a toner for developing an electrostatic charge image of the exemplary embodiment preferably uses a device equipped with a heat exchanger that performs cooling in the cooling step from the viewpoint of the cooling rate and the property of suppressing occurrence of color spots in the obtained image. More preferably, the method uses a device equipped with an aggregation and coalescence vessel in which aggregation in the aggregation step and the fusing in the fusing step are performed, a heat exchanger that performs the cooling in the cooling step, and a recovery vessel that recovers the cooled toner particle dispersion.

The cooling unit used in the cooling step may be any and can be a heat exchanger.

Examples of the heat exchanger include spiral heat exchangers, multi-tube heat exchangers, plate heat exchangers, fin-tube heat exchangers, coil heat exchangers, condenser heat exchangers, air cooling heat exchangers, and jacket heat exchangers.

Among these, spiral heat exchangers may be used from the viewpoint of the cooling rate and the property of suppressing occurrence of color spots in the obtained image.

The cooling time in the cooling step is not particularly limited; however, from the viewpoint of the property of suppressing occurrence of color spots in the obtained image, the cooling time is preferably 120 seconds or less, more preferably 60 seconds or less, yet more preferably 10 seconds or more and 50 seconds or less, and particularly preferably 15 seconds or more and 45 second or less.

From the viewpoint of the property of suppressing occurrence of color spots in the obtained image, the temperature of the dispersion containing the toner particles after the cooling step is preferably 10° C. or higher and 65° C. or lower, more preferably 25° C. or higher and 60° C. or lower, and particularly preferably 35° C. or higher and 55° C. or lower.

From the viewpoint of the property of suppressing occurrence of color spots in the obtained image, the cooling step preferably involves cooling the dispersion containing the fused particles to a temperature equal to or lower than the temperature 30° C. lower than the endothermic peak onset temperature derived from the releasing agent and equal to or higher than the temperature 60° C. lower than this onset temperature. The cooling step more preferably involves cooling the dispersion to a temperature equal to or lower than the temperature 30° C. lower than the endothermic peak onset temperature derived from the releasing agent and equal to or higher than the temperature 50° C. lower than the onset temperature, and yet more preferably involves cooling the dispersion to a temperature equal to or lower than the temperature 30° C. lower than the endothermic peak onset temperature derived from the releasing agent and equal to or higher than the temperature 35° C. lower than the onset temperature.

From the viewpoint of the property of suppressing occurrence of color spots in the obtained image, the temperature of the dispersion containing the fused particles before the cooling step is preferably 65° C. or higher and 100° C. or lower, more preferably 70° C. or higher and 90° C. or lower, and particularly preferably 75° C. or higher and 80° C. or lower.

From the viewpoint of the property of suppressing occurrence of color spots in the obtained image, the temperature of the dispersion containing the fused particles before the cooling step is preferably equal to or higher than the temperature 10° C. lower than the endothermic peak onset temperature derived from the releasing agent, is more preferably equal to or higher than the temperature 5° C. lower than the endothermic onset temperature derived from the releasing agent, and is particularly preferably equal to or higher than the temperature 5° C. lower than the endothermic peak onset temperature derived from the releasing agent and equal to or lower than the temperature 50° C. higher than the onset temperature.

From the viewpoint of the property of suppressing occurrence of color spots in the obtained image, the cooling step preferably involves decreasing the temperature of the dispersion containing the fused particles by 10° C. or more and 80° C. or less, more preferably by 15° C. or more and 60° C. or less, yet more preferably by 20° C. or more and 50° C. or less, and particularly preferably by 20° C. or more and 30° C. or less.

Slow Cooling Step

From the viewpoint of the property of suppressing occurrence of color spots in the obtained image, the method for producing a toner for developing an electrostatic charge image according to the exemplary embodiment may further include, after the fusing step and before the cooling step, a slow cooling step of cooling the dispersion containing the fused particles to a temperature equal to or lower than the temperature 3° C. lower than the endothermic peak onset temperature derived from the releasing agent at a rate of 0.1° C./min or more and 1° C./min or less. The inclusion of the slow cooling step reduces the size of the releasing agent crystals near the toner particle surfaces, suppresses coarsening of particles caused by fusion-bonding of the releasing agent particles, and offers an improved property of suppressing occurrence of color spots in the obtained image.

In the slow cooling step, from the viewpoint of the property of suppressing occurrence of color spots in the obtained image, the cooling rate is preferably 0.2° C./min or more and 0.8° C./min or less and more preferably 0.3° C./min or more and 0.7° C./min or less.

From the viewpoint of the property of suppressing occurrence of color spots in the obtained image, the temperature of the dispersion containing the fused particles after the slow cooling step is preferably 50° C. or higher and 90° C. or lower, more preferably 55° C. or higher and 85° C. or lower, and particularly preferably 60° C. or higher and 80° C. or lower.

From the viewpoint of the property of suppressing occurrence of color spots in the obtained image, the slow cooling step preferably involves cooling the dispersion containing the fused particles to a temperature equal to or lower than the temperature 3° C. lower than the endothermic peak onset temperature derived from the releasing agent and equal to or higher than the temperature 15° C. lower than the onset temperature, and more preferably involves cooling the dispersion to a temperature equal to or lower than the temperature 3° C. lower than the endothermic peak onset temperature derived from the releasing agent and equal to or higher than the temperature 10° C. lower than the onset temperature.

The cooling unit used in the slow cooling step may be any and can be an air cooling unit, an air blast cooling unit, or a heat exchanger.

From the viewpoint of the property of suppressing occurrence of color spots in the obtained image, the slow cooling step involves decreasing the temperature of the dispersion containing the fused particles preferably by 5° C. or more and 20° C. or less, more preferably by 6° C. or more and 15° C. or less, and yet more preferably by 7° C. or more and 12° C. or less.

From the viewpoint of the property of suppressing occurrence of color spots in the obtained image, the temperature of the dispersion containing the fused particles before the slow cooling step is preferably 70° C. or higher and 100° C. or lower and more preferably 70° C. or higher and 90° C. or lower.

The cooling time in the slow cooling step is not particularly limited; however, from the viewpoint of the property of suppressing occurrence of color spots in the obtained image, the cooling time is preferably 1 minute or more and 60 minutes or less, more preferably 2 minutes or more and 50 minutes or less, and particularly preferably 5 minutes or more and 20 minutes or less.

The toner particles are obtained through the aforementioned steps.

Here, upon completion of the fusing step, the toner particles formed in the solution are subjected to a known washing step, a known solid-liquid separation step, and a known drying step to obtain dry toner particles.

The washing step may involve thorough substitution washing with ion exchange water from the standpoint of chargeability. The solid-liquid separation step is not particularly limited but can involve suction filtration, pressure filtration, or the like from the viewpoint of productivity. Although the drying step is also not particularly limited, from the viewpoint of productivity, freeze drying, air drying, flow drying, vibration flow drying, or the like can be employed.

The method for producing a toner for developing an electrostatic charge image according to this exemplary embodiment can include a step of externally adding an external additive to the obtained toner particles.

The external addition method may use a V blender, a HENSCHEL mixer, a Lodige mixer, or the like, for example. Furthermore, if necessary, coarse particles in the toner may be removed by using a vibrating sieving machine, an air sieving machine, or the like.

Resin Particle Dispersion Preparation Step

The method for producing a toner for developing an electrostatic charge image according to this exemplary embodiment can include a resin particle dispersion preparation step of preparing a resin particle dispersion.

The method for producing a toner for developing an electrostatic charge image according to this exemplary embodiment can include a step of preparing a coloring agent particle dispersion containing dispersed coloring agent particles and a step of preparing a releasing agent particle dispersion containing dispersed releasing agent particles in addition to the step of preparing the resin particle dispersion containing dispersed resin particles.

A resin particle dispersion is prepared by, for example, dispersing resin particles in a dispersion medium by using a surfactant.

Examples of the dispersion medium used in the resin particle dispersion include water-based media.

Examples of the water-based media include water such as distilled water and ion exchange water, and alcohols. These may be used alone or in combination.

Examples of the surfactant include anionic surfactants such as sulfate surfactants, sulfonate surfactants, phosphate surfactants, and soap surfactants; cationic surfactants such as amine salt surfactants and quaternary ammonium salt surfactants; and nonionic surfactants such as polyethylene glycol surfactants, alkyl phenol ethylene oxide adduct surfactants, and polyhydric alcohol surfactants. Among these, an anionic surfactant and a cationic surfactant are preferable. A nonionic surfactant may be used in combination with an anionic surfactant or a cationic surfactant.

These surfactants may be used alone or in combination. Examples of the method for dispersing resin particles in a dispersion medium in preparing the resin particle dispersion include typical dispersing methods that use a rotary shear homogenizer, a ball mill having media, a sand mill, a dyno mill, etc. Depending on the type of the resin particles, the resin particles may be dispersed in a dispersion medium by a phase inversion emulsification method. The phase inversion emulsification method is a method that involves dissolving a resin to be dispersed in a hydrophobic organic solvent that can dissolve the resin, adding a base to the organic continuous phase (O phase) to neutralize, and adding a water-based medium (W phase) to the resulting product to perform W/O-to-O/W phase inversion and disperse particles of the resin in the water-based medium.

The volume average particle diameter of the resin particles to be dispersed in the resin particle dispersion is preferably 0.01 μm or more and 1 μm or less, more preferably 0.08 μm or more and 0.8 μm or less, and yet more preferably 0.1 μm or more and 0.6 μm or less.

The amount of the resin particles contained in the resin particle dispersion is preferably 5 mass % or more and 50 mass % or less and more preferably 10 mass % or more and 40 mass % or less.

The coloring agent particle dispersion and the releasing agent particle dispersion can also be prepared in the same manner as the resin particle dispersion. In other words, the volume average particle diameter, the dispersion medium, the dispersing method, and the amount of particles of the particles in the resin particle dispersion equally apply to the coloring agent particles to be dispersed in the coloring agent dispersion and the releasing agent particles to be dispersed in the releasing agent dispersion.

The method for producing a toner for developing an electrostatic charge image of the exemplary embodiment may further include a step of forming second aggregated particles after the aggregation step and before the fusing step. The step of forming second aggregated particles involves further mixing the dispersion containing the aggregated particles and a resin particle dispersion in which binder resin particles are dispersed so that the binder resin particles are further attached to the surfaces of the aggregated particles. Toner particles having a core-shell structure are formed through the step of forming second aggregated particles.

The method for producing a toner for developing an electrostatic charge image according to this exemplary embodiment can further include any known steps other than those described above.

Hereinafter, the respective components in the toner for developing an electrostatic charge image are described in detail.

The toner particles contain a binder resin, a releasing agent, and, if necessary, other components, but can contain a binder resin, a releasing agent, and a coloring agent.

Binder Resin

The binder resin preferably contains an amorphous resin and more preferably contains an amorphous resin and a crystalline resin from the viewpoints of the image strength and suppression of density nonuniformity in the obtained image. In other words, in the first aggregation step, amorphous resin particles and crystalline resin particles can be contained as the resin particles.

Here, an amorphous resin refers to a resin that exhibits only a stepwise endothermic change rather than a clear endothermic peak in thermal analysis by differential scanning calorimetry (DSC), that is solid at room temperature, and that turns thermoplastic at a temperature equal to or higher than the glass transition temperature.

In contrast, a crystalline resin refers to a resin that has a clear endothermic peak rather than a stepwise endothermic change in differential scanning calorimetry (DSC).

Specifically, for example, a crystalline resin refers to a resin that has an endothermic peak having a half width of 10° C. or less when measured at a heating rate of 10° C./min, and an amorphous resin refers to a resin that has a half width exceeding 10° C. or has no clear endothermic peak.

The amorphous resin will now be described.

Examples of the amorphous resin include known amorphous resins such as amorphous polyester resins, amorphous vinyl resins (for example, styrene acrylic resin), epoxy resins, polycarbonate resins, and polyurethane resins. Among these, amorphous polyester resins and amorphous vinyl resins (in particular, styrene acrylic resins) are preferable and amorphous polyester resins are more preferable from the viewpoints of suppressing density nonuniformity and voids in the obtained image.

An amorphous polyester resin and a styrene acrylic resin can be used in combination as the amorphous resin.

Examples of the amorphous polyester resins include polycondensation products between polycarboxylic acids and polyhydric alcohols. A commercially available amorphous polyester resin or a synthesized amorphous polyester resin may be used as the amorphous polyester resin.

Examples of the polycarboxylic acids include aliphatic dicarboxylic acids (for example, oxalic acid, malonic acid, maleic acid, fumaric acid, citraconic acid, itaconic acid, glutaconic acid, succinic acid, alkenyl succinic acid, adipic acid, and sebacic acid), alicyclic dicarboxylic acids (for example, cyclohexanedicarboxylic acid), aromatic dicarboxylic acids (for example, terephthalic acid, isophthalic acid, phthalic acid, and naphthalenedicarboxylic acid), anhydrides thereof, and lower (for example, 1 to 5 carbon atoms) alkyl esters thereof. Among these, aromatic dicarboxylic acids can be used as polycarboxylic acids.

A dicarboxylic acid and a tri- or higher carboxylic acid having a crosslinked structure or a branched structure may be used in combination as the polycarboxylic acid. Examples of the tri- or higher carboxylic acid include trimellitic acid, pyromellitic acid, anhydrides thereof, and lower (for example, 1 to 5 carbon atoms) alkyl esters thereof.

These polycarboxylic acids may be used alone or in combination.

Examples of the polyhydric alcohols include aliphatic diols (for example, ethylene glycol, diethylene glycol, triethylene glycol, propylene glycol, butanediol, hexanediol, and neopentyl glycol), alicyclic diols (for example, cyclohexanediol, cyclohexanedimethanol, and hydrogenated bisphenol A), and aromatic diols (for example, ethylene oxide adducts of bisphenol A and propylene oxide adducts of bisphenol A). Among these, aromatic diols and alicyclic diols are preferred, and aromatic diols are more preferred as the polyhydric alcohols.

A trihydric or higher alcohol having a crosslinked structure or a branched structure may be used in combination with a diol as the polyhydric alcohol. Examples of the trihydric or higher alcohol include glycerin, trimethylolpropane, and pentaerythritol.

These polyhydric alcohols may be used alone or in combination.

The amorphous polyester resin is obtained by a known production method. Specifically, the amorphous polyester resin is obtained by a method that involves, for example, setting the polymerization temperature to 180° C. or higher and 230° C. or lower, depressurizing the inside of the reaction system as necessary, and performing reaction while removing water and alcohol generated during the condensation. When the monomers of the raw materials do not dissolve or mix at the reaction temperature, a high-boiling-point solvent may be added as a dissolving aid. In such a case, the polycondensation reaction is performed while distilling away the dissolving aid. In the copolymerization reaction, when a poorly compatible monomer is present, that monomer may be subjected to condensation with an acid or alcohol for the condensation in advance, and then subjected to polycondensation with other component.

An example of the binder resin, in particular, the amorphous resin, is a styrene acrylic resin.

A styrene acrylic resin is a copolymer obtained by copolymerizing at least a styrene monomer (a monomer having a styrene skeleton) and a (meth)acryl monomer (a monomer having a (meth)acryl group, preferably, a monomer having a (meth)acryloxy group). The styrene acrylic resin includes, for example, a copolymer of a styrene monomer and a (meth)acrylate monomer.

The acrylic resin moiety in the styrene acrylic resin is a partial structure obtained by polymerizing one or both of an acryl monomer and a methacrylic monomer. The term "(meth)acryl" includes both acryl and methacryl.

Specific examples of the styrene monomer include styrene, alkyl-substituted styrene (for example, α-methylstyrene, 2-methylstyrene, 3-methylstyrene, 4-methylstyrene, 2-ethylstyrene, 3-ethylstyrene, and 4-ethylstyrene), halogen-substituted styrene (for example, 2-chlorostyrene, 3-chlorostyrene, and 4-chlorostyrene), and vinylnaphthalene. These styrene monomers may be used alone or in combination.

Among these, styrene can be used as the styrene monomer from the viewpoints of ease of reaction, ease of controlling the reaction, and availability.

Specific examples of the (meth)acryl monomer include (meth)acrylic acid and (meth)acrylate. Examples of the (meth)acrylate include (meth)acrylic acid alkyl esters (for example, methyl (meth)acrylate, ethyl (meth)acrylate, n-propyl (meth)acrylate, n-butyl (meth)acrylate, n-pentyl (meth)acrylate, n-hexyl acrylate, n-heptyl (meth)acrylate, n-octyl (meth)acrylate, n-decyl (meth)acrylate, n-dodecyl (meth)acrylate, n-lauryl (meth)acrylate, n-tetradecyl (meth) acrylate, n-hexadecyl (meth)acrylate, n-octadecyl (meth) acrylate, isopropyl (meth)acrylate, isobutyl (meth)acrylate, t-butyl (meth)acrylate, isopentyl (meth)acrylate, amyl (meth)acrylate, neopentyl (meth)acrylate, isohexyl (meth) acrylate, isoheptyl (meth)acrylate, isooctyl (meth)acrylate, 2-ethylhexyl (meth)acrylate, cyclohexyl (meth)acrylate, and t-butylcyclohexyl (meth)acrylate), (meth)acrylic acid aryl esters (for example, phenyl (meth)acrylate, biphenyl (meth) acrylate, diphenylethyl (meth)acrylate, t-butylphenyl (meth) acrylate, and terphenyl (meth)acrylate), dimethylaminoethyl (meth)acrylate, diethylaminoethyl (meth)acrylate, methoxyethyl (meth)acrylate, 2-hydroxyethyl (meth)acrylate, β-carboxyethyl (meth)acrylate, and (meth)acrylamide. These (meth)acrylate monomers may be used alone or in combination.

Among these (meth)acrylates serving as the (meth)acryl monomers, (meth)acrylates having an alkyl group having 2 to 14 carbon atoms (preferably 2 to 10 carbon atoms and more preferably 3 to 8 carbon atoms) are preferable from the viewpoint of fixability.

Among these, n-butyl (meth)acrylate is preferable, and n-butyl acrylate is particularly preferable.

The copolymerization ratio of the styrene monomer to the (meth)acryl monomer (mass basis, styrene monomer/(meth) acryl monomer) is not particularly limited and can be 85/15 to 70/30.

The styrene acrylic resin may have a crosslinked structure. An example of the styrene acrylic resin having a crosslinked structure is a resin obtained by copolymerizing at least a styrene monomer, a (meth)acrylic acid monomer, and a crosslinking monomer.

Examples of the crosslinking monomer include difunctional or higher crosslinking agents.

Examples of the difunctional crosslinking agent include divinylbenzene, divinylnaphthalene, di(meth)acrylate compounds (for example, diethylene glycol di(meth)acrylate, methylenebis(meth)acrylamide, decanediol diacrylate, and glycidyl (meth)acrylate), polyester-type di(meth)acrylate, 2-([1'-methylpropylideneamino]carboxyamino)ethyl methacrylate.

Examples of the polyfunctional crosslinking agent include tri(meth)acrylate compounds (for example, pentaerythritol tri(meth)acrylate, trimethylolethane tri(meth) acrylate, and trimethylolpropane tri(meth)acrylate), tetra(meth)acrylate compounds (for example, pentaerythritol tetra (meth)acrylate and oligo ester (meth)acrylate), 2,2-bis(4-methacryloxy, polyethoxyphenyl)propane, diallyl phthalate, triallyl cyanurate, triallyl isocyanurate, triallyl trimellitate, and diallyl chlorendate.

In particular, from the viewpoints of suppressing degradation of the image density and image density nonuniformity, and fixability, the crosslinking monomer is preferably a difunctional or higher (meth)acrylate compound, more preferably a difunctional (meth)acrylate compound, yet more preferably a difunctional (meth)acrylate compound having an alkylene group having 6 to 20 carbon atoms, and particularly preferably a difunctional (meth)acrylate compound having a linear alkylene group having 6 to 20 carbon atoms.

The copolymerization ratio of the crosslinking monomer relative to all monomers (mass basis, crosslinking monomer/all monomers) is not particularly limited and can be 2/1,000 to 20/1,000.

The method for preparing the styrene acrylic resin is not particularly limited, and various polymerization methods (for example, solution polymerization, precipitation polymerization, suspension polymerization, bulk polymerization, and emulsification polymerization) are applied. Known processes (for example, batch, semi-continuous, and continuous methods) are applied to the polymerization reaction.

The styrene acrylic resin preferably accounts for 0 mass % or more and 20 mass % or less, more preferably 1 mass % or more and 15 mass % or less, and yet more preferably 2 mass % or more and 10 mass % or less of the entire binder resin.

The amorphous resin preferably accounts for 60 mass % or more and 98 mass % or less, more preferably 65 mass % or more and 95 mass % or less, and yet more preferably 70 mass % or more and 90 mass % or less of the entire binder resin.

The properties of the amorphous resin will now be described.

The glass transition temperature (Tg) of the amorphous resin is preferably 50° C. or higher and 80° C. or lower and more preferably 50° C. or higher and 65° C. or lower.

The glass transition temperature is determined from a DSC curve obtained by differential scanning calorimetry (DSC), more specifically, according to "extrapolated glass transition onset temperature" described in the method for determining the glass transition temperature in JIS K 7121: 1987 "Testing Methods for Transition Temperatures of Plastics".

The weight average molecular weight (Mw) of the amorphous resin is preferably 5,000 or more and 1,000,000 or less and more preferably 7,000 or more and 500,000 or less.

The number average molecular weight (Mn) of the amorphous resin can be 2,000 or more and 100,000 or less.

The molecular weight distribution Mw/Mn of the amorphous resin is preferably 1.5 or more and 100 or less and more preferably 2 or more and 60 or less.

The weight average molecular weight and the number average molecular weight are measured by gel permeation chromatography (GPC). The molecular weight measurement by GPC is conducted by using GPC•HLC-8120GPC produced by TOSOH CORPORATION as a measuring instrument with columns, TSKgel Super HM-M (15 cm) produced by TOSOH CORPORATION, and a THF solvent. The weight average molecular weight and the number average molecular weight are calculated from the measurement results by using the molecular weight calibration curves obtained from monodisperse polystyrene standard samples.

The crystalline resin will now be described.

Examples of the crystalline resin include known crystalline resins such as a crystalline polyester resin and a crystalline vinyl resin (for example, a polyalkylene resin and a long chain alkyl (meth)acrylate resin). Among these, from the viewpoints of suppressing density nonuniformity and voids in the obtained image, a crystalline polyester resin can be used.

Examples of the crystalline polyester resin include polycondensation products between polycarboxylic acids and polyhydric alcohols. A commercially available crystalline polyester resin or a synthesized crystalline polyester resin may be used as the crystalline polyester resin.

To smoothly form a crystal structure, the crystalline polyester resin can be a polycondensation product obtained by using a linear aliphatic polymerizable monomer rather than a polymerizable monomer having an aromatic ring.

Examples of the polycarboxylic acids include aliphatic dicarboxylic acids (for example, oxalic acid, succinic acid, glutaric acid, adipic acid, suberic acid, azelaic acid, sebacic acid, 1,9-nonandicarboxylic acid, 1,10-decanedicarboxylic acid, 1,12-dodecanedicarboxylic acid, 1,14-tetradecanedicarboxylic acid, and 1,18-octadecanedicarboxylic acid), aromatic dicarboxylic acids (for example, dibasic acids such as phthalic acid, isophthalic acid, terephthalic acid, and naphthalene-2,6-dicarboxylic acid), anhydrides thereof, and lower (for example, 1 to 5 carbon atoms) alkyl esters thereof.

A dicarboxylic acid and a tri- or higher carboxylic acid having a crosslinked structure or a branched structure may be used in combination as the polycarboxylic acid. Examples of the tricarboxylic acid include aromatic carboxylic acids (for example, 1,2,3-benzenetricarboxylic acid, 1,2,4-benzenetricarboxylic acid, and 1,2,4-naphthalenetricarboxylic acid), anhydrides thereof, and lower (for example, 1 to 5 carbon atoms) alkyl esters thereof.

Together with these dicarboxylic acids, a dicarboxylic acid having a sulfonic acid group and a dicarboxylic acid having an ethylenic double bond may be used in combination.

These polycarboxylic acids may be used alone or in combination.

Examples of the polyhydric alcohol include aliphatic diols (for example, linear aliphatic diols having a main chain moiety having 7 to 20 carbon atoms). Examples of the aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanedecanediol. Among these, 1,8-octanediol, 1,9-nonanediol, and 1,10-decanediol are preferable as the aliphatic diol.

A trihydric or higher alcohol having a crosslinked structure or a branched structure may be used in combination with a diol in the polyhydric alcohol. Examples of the trihydric or higher alcohol include glycerin, trimethylolethane, trimethylolpropane, and pentaerythritol.

These polyhydric alcohols may be used alone or in combination.

The polyhydric alcohol preferably contains 80 mol % or more and more preferably 90 mol % or more of the aliphatic diol.

The melting temperature of the crystalline polyester resin is preferably 50° C. or higher and 100° C. or lower, more preferably 55° C. or higher and 90° C. or lower, and yet more preferably 60° C. or higher and 85° C. or lower.

The melting temperature of the crystalline polyester resin is determined from a DSC curve obtained by differential scanning calorimetry (DSC) by the method described in “Melting peak temperature”, which is one method for determining the melting temperature in JIS K 7121-1987 “Testing Methods for Transition Temperatures of Plastics”

The weight average molecular weight (Mw) of the crystalline polyester resin can be 6,000 or more and 35,000 or less.

As with the amorphous polyester resin, the crystalline polyester resin is obtained by a known production method.

From the viewpoints of smoothly forming a crystal structure and improving image fixability achieved by good compatibility with the amorphous polyester resin, the crystalline polyester resin can be a polymer formed between α,ω-linear aliphatic dicarboxylic acid and α,ω-linear aliphatic diol.

As α,ω-linear aliphatic dicarboxylic acid, α,ω-linear aliphatic dicarboxylic acid in which the alkylene group linking the two carboxy groups has 3 to 14 carbon atoms is preferable, and the alkylene group more preferably has 4 to 12 carbon atoms, and yet more preferably has 6 to 10 carbon atoms.

Examples of α,ω-linear aliphatic dicarboxylic acid include succinic acid, glutaric acid, adipic acid, 1,6-hexanedicarboxylic acid (also known as suberic acid), 1,7-heptanedicarboxylic acid (also known as azelaic acid), 1,8-octanedicarboxylic acid (also known as sebacic acid), 1,9-nonandicarboxylic acid, 1,10-decanedicarboxylic acid, 1,12-dodecanedicarboxylic acid, 1,14-tetradecanedicarboxylic acid, and 1,18-octadecanedicarboxylic acid. Among these, 1,6-hexanedicarboxylic acid, 1,7-heptanedicarboxylic acid, 1,8-octanedicarboxylic acid, 1,9-nonanedicarboxylic acid, and 1,10-decanedicarboxylic acid are preferable.

These α,ω-linear aliphatic dicarboxylic acids may be used alone or in combination.

As α,ω-linear aliphatic diol, α,ω-linear aliphatic diol in which the alkylene group linking the two hydroxy groups has 3 to 14 carbon atoms is preferable, and the alkylene group more preferably has 4 to 12 carbon atoms, and yet more preferably has 6 to 10 carbon atoms.

Examples of the α,ω-linear aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, 1,14-tetradecanediol, and 1,18-octadecanediol, and, among these, 1,6-hexanediol, 1,7-heptanediol, 1,8-octanediol, 1,9-nonanediol, and 1,10-decanediol are preferable.

These α,ω-linear aliphatic diols may be used alone or in combination.

From the viewpoints of smoothly forming a crystal structure and improving image fixability achieved by good compatibility with the amorphous polyester resin, the polymer formed between α,ω-linear aliphatic dicarboxylic acid and α,ω-linear aliphatic diol is preferably a polymer formed between at least one selected from the group consisting of 1,6-hexanedicarboxylic acid, 1,7-heptanedicarboxylic acid, 1,8-octanedicarboxylic acid, 1,9-nonanedicarboxylic acid, and 1,10-decanedicarboxylic acid and at least one selected from the group consisting of 1,6-hexanediol, 1,7-heptanediol, 1,8-octanediol, 1,9-nonanediol, and 1,10-decanediol, and is more preferably a polymer formed between 1,10-decanedicarboxylic acid and 1,6-hexanediol.

The crystalline resin preferably accounts for 1 mass % or more and 20 mass % or less, more preferably 2 mass % or more and 15 mass % or less, and yet more preferably 3 mass % or more and 10 mass % or less of the entire binder resin.

Other Binder Resin

Examples of the binder resin include homopolymers obtained from monomers such as ethylenically unsaturated nitriles (for example, acrylonitrile and methacrylonitrile), vinyl ethers (for example, vinyl methyl ether and vinyl isobutyl ether), vinyl ketones (for example, vinyl methyl ketone, vinyl ethyl ketone, and vinyl isopropenyl ketone), olefines (for example, ethylene, propylene, and butadiene), and copolymers obtained from two or more of these monomers.

Other examples of the binder resin include non-vinyl resins such as epoxy resins, polyurethane resins, polyamide resins, cellulose resins, polyether resins, and modified rosin, mixtures of these non-vinyl resins and the aforementioned vinyl resins, and graft polymers obtained by polymerizing a vinyl monomer in the presence of these resins.

These binder resins may be used alone or in combination.

The binder resin content relative to the entire toner particles is preferably 40 mass % or more and 95 mass % or less, more preferably 50 mass % or more and 90 mass % or less, and yet more preferably 60 mass % or more and 85 mass % or less.

Releasing Agent

In the aggregation step, the dispersion can further contain releasing agent particles.

Examples of the releasing agent include hydrocarbon wax; natural wax such as carnauba wax, rice wax, and candelilla wax; synthetic or mineral or petroleum wax such as montan wax; and ester wax such as fatty acid esters and montanic acid esters. The releasing agent is not limited to these.

From the viewpoints of suppressing density nonuniformity and voids in the obtained image, and improving image fixability achieved by good compatibility with the amorphous polyester resin, the releasing agent is preferably an ester wax, and more preferably an ester wax obtained from a higher fatty acid having 10 to 30 carbon atoms and a monohydric or polyhydric alcohol component having 1 to 30 carbon atoms.

The ester wax is a wax having an ester bond. The ester wax may be a monoester, a diester, a triester, or a tetraester, and a known natural or synthetic ester wax can be employed.

Examples of the ester wax include ester compounds formed between higher aliphatic acids (aliphatic acids having 10 or more carbon atoms etc.) and monohydric or polyhydric aliphatic alcohols (aliphatic alcohols having 8 or more carbon atoms etc.) and having a melting point of 60° C. or higher and 110° C. or lower (preferably 65° C. or higher and 100° C. or lower and more preferably 70° C. or higher and 95° C. or lower).

Examples of the ester wax include ester compounds obtained from higher aliphatic acids (caprylic acid, capric acid, lauric acid, myristic acid, palmitic acid, stearic acid, arachidic acid, behenic acid, oleic acid, etc.) and alcohols (monohydric alcohols such as methanol, ethanol, propanol, isopropanol, butanol, capryl alcohol, lauryl alcohol, myristyl alcohol, cetyl alcohol, stearyl alcohol, and oleyl alcohol; and polyhydric alcohols such as glycerin, ethylene glycol, propylene glycol, sorbitol, and pentaerythritol), and specific examples of the ester wax include carnauba wax, rice wax, candelilla wax, jojoba wax, wood wax, beeswax, privet wax, lanolin, and montanic acid ester wax.

The melting temperature of the releasing agent is preferably 50° C. or higher and 110° C. or lower and more preferably 60° C. or higher and 100° C. or lower.

The melting temperature of the releasing agent is determined from a DSC curve obtained by differential scanning calorimetry (DSC) by the method described in "Melting peak temperature", which is one method for determining the melting temperature in JIS K 7121-1987 "Testing Methods for Transition Temperatures of Plastics"

The endothermic peak onset temperature derived from the releasing agent is preferably 50° C. or higher and 110° C. or lower and more preferably 60° C. or higher and 100° C. or lower.

The method for measuring the endothermic peak onset temperature derived from the releasing agent in this exemplary embodiment is as follows.

A differential scanning calorimetric (DSC) curve is determined from a specimen of the fused particles, the toner particles, or the toner in accordance with ASTM D3418-8.

Specifically, 10 mg of the specimen to be measured is set on a differential scanning calorimeter (DSC-60A produced by Shimadzu Corporation) equipped with an automatic tangent processing system, and heated from room temperature (25° C.) to 150° C. at a temperature elevation rate of 10° C./min to obtain a temperature elevation spectrum (DSC curve) of the first temperature elevation cycle.

From the obtained temperature elevation spectrum (DSC curve), an endothermic peak derived from the releasing agent is identified. Here, the endothermic peak is a peak having a half width of within 15° C.

Next, the endothermic peak onset temperature derived from the releasing agent identified is measured.

Here, the onset temperature is a temperature at an intersection A between a straight line drawn by extending the low temperature-side base line of the identified endothermic peak toward the high temperature side in the temperature elevation spectrum (DSC curve) and a tangent drawn at the largest gradient point (inflection point) with respect to a curve indicating the calorimetric changes in the identified endothermic peak from the start of endotherm to the apex of the endothermic peak during the temperature elevation.

The releasing agent content relative to the entire toner particles is preferably 1 mass % or more and 20 mass % or less and more preferably 5 mass % or more and 15 mass % or less.

Coloring Agent

In the aggregation step, the dispersion can further contain coloring agent particles.

Examples of the coloring agent include various pigments such as carbon black, chrome yellow, hansa yellow, benzidine yellow, threne yellow, quinoline yellow, pigment yellow, permanent orange GTR, pyrazolone orange, vulcan orange, watchung red, permanent red, brilliant carmine 3B, brilliant carmine 6B, dupont oil red, pyrazolone red, lithol red, rhodamine B lake, lake red C, pigment red, rose bengal, aniline blue, ultramarine blue, calco oil blue, methylene blue chloride, phthalocyanine blue, pigment blue, phthalocyanine green, and malachite green oxalate; and dyes such as acridine dyes, xanthene dyes, azo dyes, benzoquinone dyes, azine dyes, anthraquinone dyes, thioindigo dyes, dioxazine dyes, thiazine dyes, azomethine dyes, indigo dyes, phthalocyanine dyes, aniline black dyes, polymethine dyes, triphenylmethane dyes, diphenylmethane dyes, and thiazole dyes.

These coloring agents may be used alone or in combination.

The coloring agent may be surface-treated as necessary, or may be used in combination with a dispersing agent. Multiple coloring agents may be used in combination.

The coloring agent content relative to the entire toner particles is, for example, preferably 1 mass % or more and 30 mass % or less and more preferably 3 mass % or more and 15 mass % or less.

Other Additives

Examples of other additives include known additives such as magnetic materials, charge controllers, and inorganic powders. These additives are contained in the toner particles as internal additives.

Properties and Other Features of Toner Particles

The toner particles may have a single layer structure or a core-shell structure constituted by a core (core particles) and a coating layer (shell layer) covering the core (core-shell particles). The toner particles having a core-shell structure is constituted by, for example, a core that contains a binder resin and, optionally, a coloring agent, a releasing agent, etc., and a coating layer that contains a binder resin.

In particular, the toner particles are preferably core-shell-type particles from the viewpoints of low-temperature fixability and suppression of color streaks.

The volume average particle diameter ($D_{50v}$) of the toner is preferably 2 μm or more and 10 μm or less and more preferably 4 μm or more and 8 μm or less.

The volume average particle diameter of the toner is measured by using Coulter Multisizer II (produced by Beckman Coulter Inc.) with ISOTON-II (produced by Beckman Coulter Inc.) as the electrolyte.

In measurement, 0.5 mg or more and 50 mg or less of a measurement sample is added to 2 mL of a 5 mass % aqueous solution of a surfactant (for example, sodium alkyl benzenesulfonate) serving as the dispersing agent. The resulting mixture is added to 100 mL or more and 150 mL or less of the electrolyte.

The electrolyte in which the sample has been suspended is dispersed for 1 minute with an ultrasonic disperser, and the particle diameter of each of the particles having a diameter in the range of 2 μm or more and 60 μm or less is measured by using Coulter Multisizer II with apertures having an aperture diameter of 100 μm. The number of particles sampled is 50,000.

For the measured particle diameters, a volume-based cumulative distribution is plotted from the small diameter side, and the particle diameter at 50% accumulation is defined as a volume average particle diameter $D_{50v}$.

In this exemplary embodiment, the average circularity of the toner particles is not particularly limited; however, from the viewpoint of improving the cleaning property of the toner from the image carrying body, the average circularity is preferably 0.91 or more and 0.98 or less, more preferably 0.94 or more and 0.98 or less, and yet more preferably 0.95 or more and 0.97 or less.

In this exemplary embodiment, the circularity of a toner particle refers to a value of (perimeter of a circle having the same area as the projected image of the particle)/(perimeter of the projected image of the particle), and the average circularity of the toner particles refers to a circularity at 50% accumulation from the smaller side in the circularity distribution. The average circularity of the toner particles is determined by analyzing at least 3,000 toner particles by using a flow particle image analyzer.

The average circularity of the toner particles can be controlled by, for example, adjusting the speed of stirring the dispersion, the temperature of the dispersion, or the retention time of the dispersion in the fusing step.

External Additive

The toner produced by the method for producing a toner for developing an electrostatic charge image according to this exemplary embodiment can further include an external additive if needed.

Furthermore, the toner produced by the method for producing a toner for developing an electrostatic charge image according to this exemplary embodiment may be toner particles that have no external additives or toner particles with an external additive externally added thereto.

An example of the external additive is inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO{\cdot}SiO_2$, $K_2O(TiO_2)_n$, $Al_2O_3.2SiO_2$, $CaCO_3$, $MgCO_3$, $BaSO_4$, and $MgSO_4$.

The surfaces of the inorganic particles used as an external additive may be hydrophobized. Hydrophobizing involves, for example, dipping inorganic particles in a hydrophobizing agent. The hydrophobizing agent is not particularly limited, and examples thereof include a silane coupling agent, a silicone oil, a titanate coupling agent, and an aluminum coupling agent. These may be used alone or in combination.

The amount of the hydrophobizing agent can be 1 part by mass or more and 10 parts by mass or less relative to 100 parts by mass of the inorganic particles.

Examples of the external additive also include resin particles (resin particles of polystyrene, polymethyl methacrylate (PMMA), melamine resin, and the like) and cleaning active agents (for example, particles of higher aliphatic acid metal salts such as zinc stearate and fluorine polymers).

The external addition amount of the external additive is, for example, preferably 0.01 mass % or more and 10 mass % or less and more preferably 0.01 mass % or more and 6 mass % or less relative to the toner particles.

Electrostatic Charge Image Developer

The electrostatic charge image developer according to an exemplary embodiment contains at least the toner produced by the method for producing a toner for developing an electrostatic charge image according to the exemplary embodiment.

The electrostatic charge image developer of this exemplary embodiment may be a one-component developer that contains only the toner produced by the method for producing a toner for developing electrostatic charge image according to this exemplary embodiment, or may be a two-component developer that is a mixture of the toner and a carrier.

The carrier is not particularly limited, and examples thereof include known carriers. Examples of the carrier include a coated carrier obtained by covering a surface of a core formed of a magnetic powder with a coating resin; a magnetic powder-dispersed carrier in which a magnetic powder is dispersed and blended in a matrix resin; and a resin-impregnated carrier in which a porous magnetic powder is impregnated with a resin.

The magnetic powder-dispersed carrier and the resin-impregnated carrier may be a carrier constituted by cores covered with a coating resin.

Examples of the magnetic powder include magnetic metals such as iron, nickel, and cobalt, and magnetic oxides such as ferrite and magnetite.

Examples of the coating resin and the matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylate copolymer, an organosiloxane bond-containing straight silicone resin and modified products thereof, a fluororesin, polyester, polycarbonate, phenolic resin, and epoxy resin.

The coating resin and the matrix resin may each contain other additives such as conductive particles.

Examples of the conductive particles include particles of metals such as gold, silver, and copper, carbon black, titanium oxide, zinc oxide, tin oxide, barium sulfate, aluminum borate, and potassium titanate.

Here, an example of the method for covering the surface of the core with the coating resin is a method that involves coating the surface of the core with a coating layer-forming solution prepared by dissolving the coating resin and, as necessary, various additives in an appropriate solvent. The solvent is not particularly limited and may be selected by taking into account the coating resin to be used, application suitability, etc.

Specific examples of the resin coating method include a dipping method that involves dipping a core in a coating layer-forming solution, a spraying method that involves spraying a coating layer-forming solution onto the surface of a core, a flow bed method that involves spraying a coating layer-forming solution while the core is floated on flowing air, and a kneader coater method that involves mixing the core formed of a carrier and a coating layer-forming solution in a kneader coater and then removing the solvent.

The toner-to-carrier mixing ratio (mass ratio) of the two-component developer is preferably toner:carrier=1:100 to 30:100 and more preferably 3:100 to 20:100.

Image Forming Apparatus and Image Forming Method

An image forming apparatus and an image forming method according to this exemplary embodiment will now be described.

The image forming apparatus according to this exemplary embodiment includes an image carrying body, a charging unit that charges a surface of the image carrying body, an electrostatic charge image forming unit that forms an electrostatic charge image on the charged surface of the image carrying body, a developing unit that stores the electrostatic charge image developer and develops the electrostatic charge image on the surface of the image carrying body into a toner image by using the electrostatic charge image developer, a transfer unit that transfers the toner image on the surface of the image carrying body onto a surface of a recording medium, and a fixing unit that fixes the transferred toner image onto the surface of the recording medium. The electrostatic charge image developer of this exemplary embodiment is employed as this electrostatic charge image developer.

The image forming apparatus according to this exemplary embodiment is used to perform an image forming method (the image forming method according to this exemplary embodiment) that includes a charging step of charging a surface of an image carrying body, an electrostatic charge image forming step of forming an electrostatic charge image on the charged surface of the image carrying body, a developing step of developing the electrostatic charge image on the surface of the image carrying body into a toner image by using the electrostatic charge image developer of the exemplary embodiment, a transfer step of transferring the toner image on the surface of the image carrying body onto a surface of a recording medium, and a fixing step of fixing the transferred toner image onto the surface of the recording medium.

A known image forming apparatus is applied as the image forming apparatus of this exemplary embodiment. Examples of the known image forming apparatus include a direct transfer type apparatus with which a toner image formed on a surface of an image carrying body is directly transferred onto a recording medium; an intermediate transfer type apparatus with which a toner image formed on a surface of an image carrying body is first transferred onto a surface of an intermediate transfer body and then the toner image on the intermediate transfer body is transferred for the second time onto a surface of a recording medium; an apparatus equipped with a cleaning unit that cleans the surface of an image carrying body after the toner image transfer and before charging; and an apparatus equipped with a charge erasing unit that irradiates the surface of an image carrying body with charge erasing light to remove charges after the toner image transfer and before charging.

Among these, an image forming apparatus equipped with a cleaning unit that cleans the surface of the image carrying body is suitable. The cleaning unit can be a cleaning blade.

When an intermediate transfer type apparatus is to be employed, the transfer unit is equipped with, for example, an intermediate transfer body having a surface onto which a toner image is transferred, a first transfer unit that transfers the toner image on the surface of the image carrying body onto the surface of the intermediate body, and a second transfer unit that transfers the toner image on the surface of the intermediate transfer body onto a surface of a recording medium.

In the image forming apparatus of this exemplary embodiment, for example, a section that includes the developing unit may have a cartridge structure (process cartridge) that can be attached to and detached from the image forming apparatus. For example, the process cartridge can be equipped with a developing unit that stores the electrostatic charge image developer of the exemplary embodiment.

Hereinafter, one example of the image forming apparatus of the exemplary embodiment is described, but the image forming apparatus is not limited by the description below. The relevant parts illustrated in the drawings are described, and description of other parts is omitted.

FIG. 1 is a schematic diagram illustrating an image forming apparatus according to an exemplary embodiment.

The image forming apparatus illustrated in FIG. 1 is equipped with first to fourth image forming units 10Y, 10M, 10C, and 10K (image forming units) of an electrophotographic type configured to output images of respective colors, yellow (Y), magenta (M), cyan (C), and black (K), on the basis of the color separated image data. These image forming units (hereinafter may be simply referred to as "units") 10Y, 10M, 10C, and 10K are disposed side-by-side separated from each other by a predetermined distance in the horizontal direction. These units 10Y, 10M, 10C, and 10K may be process cartridges that can be attached to and detached from the image forming apparatus.

An intermediate transfer belt 20 that serves as an intermediate transfer body for all of the units 10Y, 10M, 10C, and 10K extends above the units 10Y, 10M, 10C, and 10K as viewed in the drawing. The intermediate transfer belt 20 is wound around a drive roll 22 and a support roll 24 that are arranged to be spaced from each other in the left-to-right direction in the drawing. The support roll 24 is in contact with the inner surface of the intermediate transfer belt 20, and the intermediate transfer belt 20 runs in a direction from the first unit 10Y toward the fourth unit 10K. A force that urges the support roll 24 to move in a direction away from the drive roll 22 is applied to the support roll 24 by a spring or the like not illustrated in the drawing so that a tension is applied to the intermediate transfer belt 20 wound around the support roll 24 and the drive roll 22. In addition, an intermediate transfer body cleaning device 30 that faces the drive roll 22 is disposed on the surface of the intermediate transfer belt 20 that carries the images.

Toners of four colors, yellow, magenta, cyan, and black, are stored in toner cartridges 8Y, 8M, 8C, and 8K and supplied to developing devices (developing units) 4Y, 4M, 4C, and 4K of the units 10Y, 10M, 10C, and 10K.

Since the first to fourth units 10Y, 10M, 10C, and 10K are identical in structure, only the first unit 10Y that forms a yellow image and is disposed on the upstream side of the intermediate transfer belt running direction is described as a representative example in the description below. Note that parts equivalent to those of the first unit 10Y are referred by reference signs having magenta (M), cyan (C), or black (K) added thereto instead of yellow (Y) to omit the descriptions of the second to fourth units 10M, 10C, and 10K.

The first unit 10Y has a photoreceptor 1Y that serves as an image carrying body. A charging roll (one example of the charging unit) 2Y that charges the surface of the photoreceptor 1Y to a predetermined potential, the exposing device (one example of the electrostatic charge image forming unit) 3 that forms an electrostatic charge image by exposing the charged surface with a laser beam 3Y on the basis of a color-separated image signal, a developing device (one example of the developing unit) 4Y that develops the electrostatic charge image by supplying the charged toner to the electrostatic charge image, a first transfer roll 5Y (one example of the first transfer unit) that transfers the developed toner image onto the intermediate transfer belt 20, and a photoreceptor cleaning device (one example of the cleaning unit) 6Y that removes the toner remaining on the surface of the photoreceptor 1Y after the first transfer are arranged in the order around the photoreceptor 1Y.

The first transfer roll 5Y is disposed on the inner side of the intermediate transfer belt 20 and faces the photoreceptor 1Y. Furthermore, each of the first transfer rolls 5Y, 5M, 5C, and 5K is connected to a bias power supply (not illustrated) that applies a first transfer bias. The bias power supplies control and vary the transfer biases to be applied to the respective first transfer rolls by controllers not illustrated in the drawing.

Hereinafter, the operation of forming a yellow image in the first unit 10Y is described.

First, prior to the operation, the surface of the photoreceptor 1Y is charged to a potential of −600 V to −800 V by the charging roll 2Y.

The photoreceptor 1Y is formed by forming a photosensitive layer on a conductive (for example, the volume resistivity of $1\times10^{-6}$ Ωcm or less at 20° C.) substrate. This photosensitive layer usually has high resistance (resistance of resins in general) but has a property that the part irradiated with a laser beam 3Y undergoes a change in resistivity. Thus the laser beam 3Y is output toward the charged surface of the photoreceptor 1Y through the exposing device 3 according to the yellow image data sent from a controller not illustrated in the drawing. The laser beam 3Y irradiates the photosensitive layer on the surface of the photoreceptor 1Y and thereby forms an electrostatic charge image of a yellow image pattern on the surface of the photoreceptor 1Y.

The electrostatic charge image is an image formed on the surface of the photoreceptor 1Y as a result of charging, and is a so-called negative latent image formed by the charges remaining in the portion of the photosensitive layer not irradiated with the laser beam 3Y as the charges on the surface of the photoreceptor 1Y in the portion of the photosensitive layer irradiated with the laser beam 3Y flow due to the decreased resistivity of the irradiated portion.

The electrostatic charge image on the photoreceptor 1Y is rotated to a predetermined development position as the photoreceptor 1Y is run. Then at this development position, the electrostatic charge image on the photoreceptor 1Y is visualized (developed image) into a toner image by the developing device 4Y.

For example, an electrostatic charge image developer that contains at least a yellow toner and a carrier is stored in the developing device 4Y. The yellow toner is frictionally charged by being stirred in the developing device 4Y and is carried on a developer roll (an example of a developer carrying member) by having charges of the same polarity (negative polarity) as the charges on the photoreceptor 1Y. Then as the surface of the photoreceptor 1Y passes the developing device 4Y, the yellow toner electrostatically adheres to the latent image portion from which the charges on the surface of the photoreceptor 1Y have been removed, and thus the latent image is developed with the yellow toner. The photoreceptor 1Y on which the yellow toner image has been formed is continuously run at a predetermined speed, and the toner image developed on the photoreceptor 1Y is conveyed to a predetermined first transfer position.

As the yellow toner image on the photoreceptor 1Y is conveyed to the first transfer position, a first transfer bias is applied to the first transfer roll 5Y, an electrostatic force acting from the photoreceptor 1Y toward the first transfer roll 5Y acts on the toner image, and the toner image on the photoreceptor 1Y is transferred onto the intermediate transfer belt 20. The transfer bias applied here has a polarity (+) opposite of the polarity (−) of the toner, and, for example, the transfer bias is controlled to +10 μA by a controller (not illustrated) in the first unit 10Y.

Meanwhile, the toner remaining on the photoreceptor 1Y is removed and recovered by the photoreceptor cleaning device 6Y.

The first transfer biases applied to the first transfer rolls 5M, 5C, and 5K of the second unit 10M and onward are controlled in accordance with the first unit.

As such, the intermediate transfer belt 20 onto which the yellow toner image has been transferred in the first unit 10Y is sequentially conveyed through the second to fourth units 10M, 10C, and 10K, and toner images of respective colors are superimposed on each other (multiple transfer).

The intermediate transfer belt 20 onto which the toner images of four colors have been transferred through the first to fourth units reaches a second transfer section constituted by the intermediate transfer belt 20, the support roll 24 in contact with the inner surface of the intermediate transfer belt 20, and a second transfer roll (one example of the second transfer unit) 26 disposed on the image-carrying surface-side of the intermediate transfer belt 20. Meanwhile, a supplying mechanism supplies a recording sheet (one example of the recording medium) P, at a predetermined timing, to a gap between the second transfer roll 26 and the intermediate transfer belt 20 in contact with each other, and a second transfer bias is applied to the support roll 24. The transfer bias applied at this stage has the same polarity (−) as the polarity (−) of the toner, and an electrostatic force acting from the intermediate transfer belt 20 toward the recording sheet P acts on the toner image, and the toner image on the intermediate transfer belt is transferred onto the recording sheet P. Here, the second transfer bias is determined on the basis of the resistance detected with a resistance detection unit (not illustrated) that detects the resistance of the second transfer section, and is voltage-controlled.

Subsequently, the recording sheet P is sent into a contact section (nip section) between a pair of fixing rolls of a fixing device (one example of the fixing unit) 28, and the toner image is fixed onto the recording sheet P to form a fixed image.

Examples of the recording sheet P used to transfer the toner image include regular paper used in electrophotographic copier and printers, etc. The recording medium may be OHP sheets and the like instead of the recording sheet P.

In order to further improve the smoothness of the image surface after fixing, the surface of the recording sheet P can also be smooth, and examples of such a recording sheet P include coated paper obtained by coating the surface of regular paper with a resin or the like, and art paper used in printing.

The recording sheet P after completion of fixing of the color image is conveyed toward a discharge section, thereby terminating a series of color image forming operations.

Process Cartridge and Toner Cartridge

A process cartridge according to an exemplary embodiment will now be described.

The process cartridge of this exemplary embodiment is equipped with a developing unit that stores the electrostatic charge image developer of the exemplary embodiment and develops an electrostatic charge image on the surface of an image carrying body into a toner image by using the electrostatic charge image developer, and is detachably attachable to an image forming apparatus.

The process cartridge of this exemplary embodiment is not limited to the aforementioned structure, and may be have a structure that includes a developing device and, if needed, at least one selected from other units, for example, an image carrying body, a charging unit, an electrostatic charge image forming unit, and a transfer unit.

Hereinafter, one example of the process cartridge according to the exemplary embodiment is described, but the process cartridge is not limited by the description below. The relevant parts illustrated in the drawings are described, and description of other parts is omitted.

Figure 2:
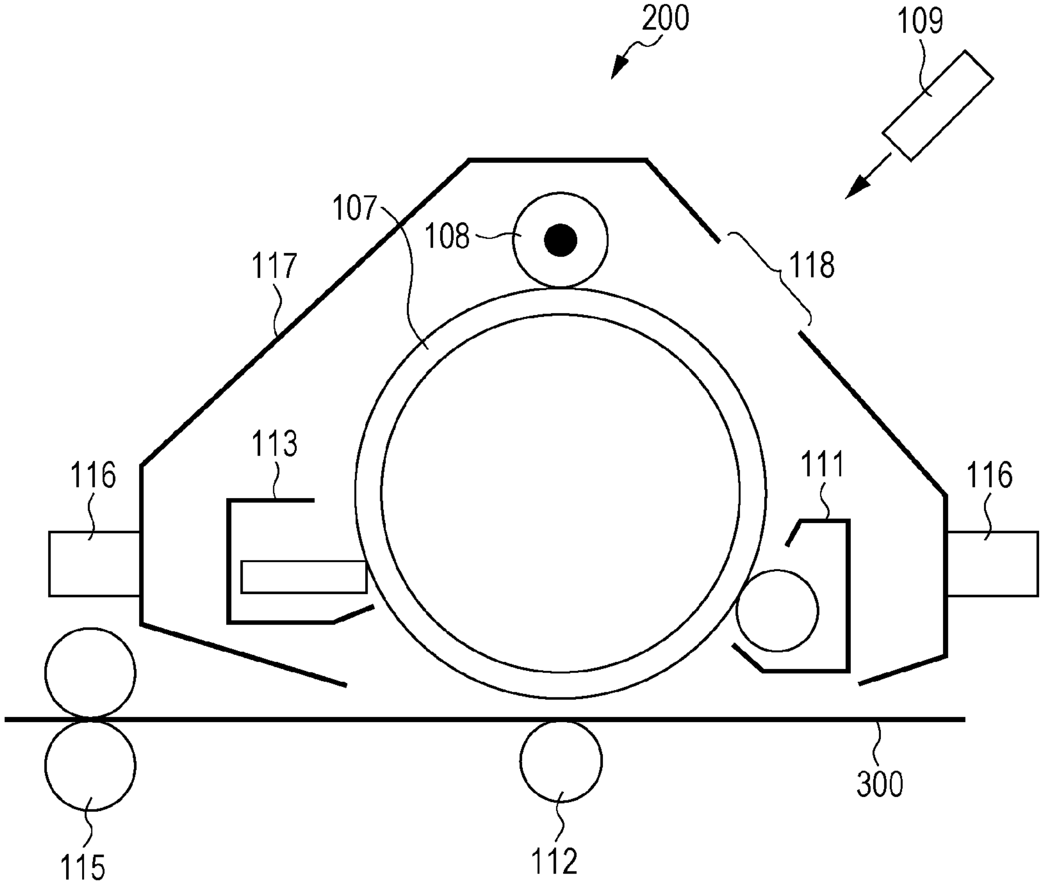
FIG. 2 is a schematic diagram illustrating one example of a process cartridge according to an exemplary embodiment.

FIG. 2 is a schematic diagram illustrating a process cartridge of an exemplary embodiment.

A process cartridge 200 illustrated in FIG. 2 is constituted by a casing 117 equipped with a guide rail 116 and an opening 118 for exposure, the casing integrating a photoreceptor 107 (one example of the image carrying body), a charging roll 108 (one example of the charging unit) disposed around the photoreceptor 107, a developing unit 111 (one example of the developing unit), and a photoreceptor cleaning unit 113 (one example of the cleaning unit) to form a cartridge.

Note that in FIG. 2, 109 denotes an exposure device (one example of the electrostatic charge image forming unit), 112 denotes a transfer device (one example of the transfer unit), 115 denotes a fixing device (one example of the fixing unit), and 300 denotes a recording sheet (one example of the recording medium).

Next, a toner cartridge according to an exemplary embodiment is described.

The toner cartridge of this exemplary embodiment stores the toner of the exemplary embodiment and is detachably attachable to an image forming apparatus. The toner cartridge stores replenishment toner to be supplied to the developing unit in the image forming apparatus.

The image forming apparatus illustrated in FIG. 1 is of a type that the toner cartridges 8Y, 8M, 8C, and 8K are detachably attachable, and the developing devices 4Y, 4M, 4C, and 4K are respectively connected to the toner cartridges corresponding to the respective developing devices (colors) through toner supply tubes. Moreover, when the toner in the toner cartridge runs low, the toner cartridge is replaced.

EXAMPLES

Hereinafter the exemplary embodiments are specifically described in details through examples and comparative examples which do not limit the scope of the exemplary embodiments. Note that the "parts" and "%" indicating amounts are on a mass basis unless otherwise noted.

Synthesis of Polyester Resin P1

Into a reactor equipped with a stirrer, a thermometer, a condenser, and a nitrogen gas inlet tube, 80 mol parts of polyoxypropylene (2,2)-2,2-bis(4-hydroxyphenyl)propane, 10 mol parts of ethylene glycol, 10 mol parts of cyclohexanediol, 80 mol parts of terephthalic acid, 10 mol parts of isophthalic acid, and 10 mol parts of n-dodecenyl succinic acid are placed, and the inside of the reactor is purged with dry nitrogen gas. Next, 0.25 parts by mass of titanium tetrabutoxide serving as a catalyst is added relative to 100 parts by mass of the aforementioned monomer components. Under a nitrogen gas stream, the reaction is conducted at 170° C. for 3 hours while stirring, the temperature is then further elevated to 210° C. over the period of 1 hour, the inside of the reactor is depressurized to 3 kPa, and the reaction is performed at a reduced pressure for 13 hours while stirring to obtain a polyester resin.

Preparation of Polyester Resin Particle Dispersion 1

Next, into a jacketed reactor (BJ-30N produced by ELEA) equipped with a condenser, a thermometer, a water dripping device, and an anchor blade, 200 parts by mass of the polyester resin P1, 100 parts by mass of methyl ethyl ketone, and 70 parts by mass of isopropyl alcohol are placed, and while the temperature is maintained at 70° C. in a water-circulating constant temperature vessel, the resulting mixture is stirred and mixed at 100 rpm to dissolve the resin. Subsequently, the stirring rotation rate is changed to 150 rpm, the water-circulating constant temperature vessel is set to 66° C., 10 parts of a 10% ammonia water (reagent) is added over a period of 10 minutes, and a total of 600 parts by mass of ion exchange water kept at 66° C. is added thereto dropwise at a rate of 5 parts by mass/min to perform phase inversion and obtain an emulsion. Into a round-bottomed flask, 600 parts of the obtained emulsion and 525 parts by mass of ion exchange water are placed, and the flask is set to an evaporator (produced by ELEA) equipped with a vacuum control unit via a trap ball. The round-bottomed flask is heated on a 60° C. bath while being rotated, and the pressure is reduced to 7 kPa while avoiding bumping to remove the solvent. The pressure is returned to normal when the amount of the recovered solvent has reached 825 parts, and the round-bottomed flask is cooled with water to obtain a dispersion. Thereto, ion exchange water is added to obtain a polyester resin particle dispersion 1 having a solid component concentration of 20 mass %.

Synthesis of Polyester Resin P2

In a heated and dried two-necked flask, 74 parts of dimethyl adipate, 192 parts of dimethyl terephthalate, 216 parts of bisphenol A ethylene oxide adduct, 38 parts of ethylene glycol, and 0.037 parts of tetrabutoxytitanate serving as a catalyst are placed, nitrogen gas is introduced into the inside of the flask, and the temperature is elevated while maintaining the inert atmosphere under stirring. Then the condensation copolymerization reaction is performed for about 7 hours at 160° C., and, subsequently, while the pressure is gradually reduced to 10 Torr, the temperature is elevated to 220° C. and held thereat for 4 hours. The pressure is then returned to normal, 9 parts of trimellitic anhydride is added, and the pressure is again gradually reduced to 10 Torr and retained thereat for 1 hour to synthesize a polyester resin.

Preparation of Polyester Resin Particle Dispersion 2

Next, into a jacketed reactor (BJ-30N produced by ELEA) equipped with a condenser, a thermometer, a water dripping device, and an anchor blade, 200 parts by mass of the polyester resin P2, 100 parts by mass of methyl ethyl ketone, and 70 parts by mass of isopropyl alcohol are placed, and while the temperature is maintained at 70° C. in a water-circulating constant temperature vessel, the resulting mixture is stirred and mixed at 100 rpm to dissolve the resin. Subsequently, the stirring rotation rate is changed to 150 rpm, the water-circulating constant temperature vessel is set to 66° C., 10 parts of a 10% ammonia water (reagent) is added over a period of 10 minutes, and a total of 600 parts by mass of ion exchange water kept at 66° C. is added thereto dropwise at a rate of 5 parts by mass/min to perform phase inversion and obtain an emulsion. Into a round-bottomed flask, 600 parts of the obtained emulsion and 525 parts by mass of ion exchange water are placed, and the flask is set to an evaporator (produced by ELEA) equipped with a vacuum control unit via a trap ball. The round-bottomed flask is heated on a 60° C. bath while being rotated, and the pressure is reduced to 7 kPa while avoiding bumping to remove the solvent. The pressure is returned to normal when the amount of the recovered solvent has reached 825 parts, and the round-bottomed flask is cooled to obtain a dispersion. Thereto, ion exchange water is added to obtain a polyester resin particle dispersion 2 having a solid component concentration of 20 mass %.

Preparation of Releasing Agent Particle Dispersion 1 paraffin wax (A1, FNP92 produced by produced by Nippon Seiro Co., Ltd., endothermic peak onset temperature: 81° C.): 45 parts
anionic surfactant (NEOGEN RK produced by DKS Co., Ltd.): 5 parts
ion exchange water: 200 parts The aforementioned materials are mixed and heated to 95° C. The resulting mixture is dispersed by using a homogenizer (ULTRA-TURRAX T50 produced by IKA Japan). The resulting dispersion is then dispersed in a Manton-Gaulin high-pressure homogenizer (produced by Gaulin Company) to prepare a releasing agent particle dispersion 1 (solid component concentration: 20%) containing a dispersed releasing agent. The volume average particle diameter of the releasing agent particles is 0.19 μm.

Preparation of Releasing Agent Particle Dispersion 2 hydrocarbon wax (A2, PW725 produced by produced by Toyo Petrolite Co., Ltd., endothermic peak onset temperature: 82° C.): 45 parts
anionic surfactant (NEOGEN RK produced by DKS Co., Ltd.): 5 parts
ion exchange water: 200 parts The aforementioned materials are mixed and heated to 95° C. The resulting mixture is dispersed by using a homogenizer (ULTRA-TURRAX T50 produced by IKA Japan). The resulting dispersion is then dispersed in a Manton-Gaulin high-pressure homogenizer (produced by Gaulin Company) to prepare a releasing agent particle dispersion 2 (solid component concentration: 20%) containing a dispersed releasing agent. The volume average particle diameter of the releasing agent particles is 0.23 μm.

Preparation of Releasing Agent Particle Dispersion 3 paraffin wax (A3, HNP9 produced by produced by Nippon Seiro Co., Ltd., endothermic peak onset temperature: 67° C.) 45 parts
anionic surfactant (NEOGEN RK produced by DKS Co., Ltd.): 5 parts
ion exchange water: 200 parts The aforementioned materials are mixed and heated to 90° C. The resulting mixture is dispersed by using a homogenizer (ULTRA-TURRAX T50 produced by IKA Japan). The resulting dispersion is then dispersed in a Manton-Gaulin high-pressure homogenizer (produced by Gaulin Company) to prepare a releasing agent particle dispersion 3 (solid component concentration: 20%) containing a dispersed releasing agent. The volume average particle diameter of the releasing agent particles is 0.20 μm.

Preparation of Coloring Agent Particle Dispersion cyan pigment (Pigment Blue 15:3 (copper phthalocyanine) produced by Dainichiseika Color & Chemicals Mfg. Co.): 98 parts
anionic surfactant (NEOGEN R produced by DKS Co., Ltd.): 2 parts ion exchange water: 400 parts The aforementioned materials are mixed and dissolved, and the resulting mixture is dispersed for 10 minutes by using a homogenizer (IKA ULTRA-TURRAX) to obtain a coloring agent particle dispersion having a center particle diameter of 0.16 μm and a solid content of 20%.

Preparation of Carrier

Into a pressure kneader, 100 parts of ferrite particles (produced by Powdertech Co., Ltd., average particle diameter: 50 μm), 1.5 parts of a polymethyl methacrylate resin (produced by MITSUBISHI RAYON CO., LTD., weight average molecular weight: 95,000, the ratio of the components having a weight-average molecular weight of 10,000 or less: 5%), and 500 parts of toluene are placed, the resulting mixture is stirred and mixed at room temperature for 15 minutes, and then the temperature is elevated to 70° C. while mixing and depressurizing so as to distill away toluene. The resulting mixture is then cooled and classified through a 105 μm screen to obtain a resin-coated ferrite carrier.

Example 1

Preparation of Toner

Preparation of Toner Particles (1)

polyester resin particle dispersion 1: 100 parts by mass
coloring agent particle dispersion: 10 parts by mass
releasing agent particle dispersion 1: 9 parts by mass
anionic surfactant (TaycaPower BN2060 produced by TAYCA Co., Ltd.): 1 part by mass
ion exchange water: 200 parts by mass The aforementioned raw materials are placed in a cylindrical stainless steel container 1 (aggregation and coalescence vessel), and the pH is adjusted to 3.0 by adding 3 parts of a 0.3 M (=0.3 mol/L) aqueous nitric acid solution. Then, 50 parts of a 10% aqueous solution of aluminum sulfate serving as an aggregating agent is added dropwise while applying shear force at 6,000 rpm by ULTRA-TURRAX (produced by IKA Japan), and the resulting mixture is stirred for 5 minutes. Next, the mixture of the aforementioned raw materials is heated up to 45° C. with a heating mantle and retained thereat for 30 minutes. Then a coating resin particle dispersion prepared by adjusting the pH of a mixture of 25 parts of the polyester resin particle dispersion 1 and 10 parts of ion exchange water to 3.0 in advance is added thereto, and the resulting mixture is retained for 10 minutes. Subsequently, in order to terminate growth of the coated aggregated particles (attached particles), a 1 M (=1 mol/L) aqueous sodium hydroxide solution is added to adjust the pH of the raw material mixture to 8.0. The temperature is then elevated to 85° C. at a temperature elevation rate of 1° C./min to fusion-bond the aggregated particles. After reaching 85° C., the average circularity is measured every 30 minutes, and the resulting mixture is retained until the average circularity reaches 0.966.

Subsequently, the mixture is cooled to 76° C. at a rate of 0.5° C./min. Next, the mixture is cooled at a rate of 65° C./min by adjusting the flow rate from the cylindrical stainless steel container 1 so that the residence time in the heat exchanger (spiral type) is 23 seconds, and the resulting slurry is discharged into a cylindrical stainless steel container 2 (recovery vessel).

The slurry is then filtered, re-dispersed in 3,000 parts by mass of ion exchange water, and subjected to solid-liquid separation by Nutsche suction filtration. This operation is performed six times to obtain a wet cake. The wet cake is vacuum-dried for 12 hours, and toner particles (1) having a volume-average particle diameter of 6.0 μm and an average circularity of 0.966 are obtained as a result.

Preparation of Toner and Developer

Next, to 50 parts by mass of the toner particles (1), 1.5 parts by mass of hydrophobic silica (TS720 produced by Cabot Corporation) is added, and the resulting mixture is blended in a sample mill to obtain a toner 1 (toner for developing an electrostatic charge image). The toner 1 and a carrier are mixed to prepare an electrostatic charge image developer 1 having a toner concentration of 7 mass %.

Example 2

A toner and a developer are prepared as in Example 1 except that the mixture is cooled at a rate of 30° C./min by adjusting the flow rate so that the residence time in the heat exchanger (spiral type) is 50 seconds, and then the slurry is discharged into the recovery vessel.

Example 3

A toner and a developer are prepared as in Example 1 except that the mixture is cooled at a rate of 130° C./min by adjusting the flow rate so that the residence time in the heat exchanger (spiral type) is 12 seconds, and then the slurry is discharged into the recovery vessel.

Example 4

A toner and a developer are prepared as in Example 1 except that the mixture is cooled to 76° C. at a rate of 0.1° C./min after the average circularity has reached 0.966.

Example 5

A toner and a developer are prepared as in Example 1 except that the mixture is cooled to 76° C. at a rate of 1° C./min after the average circularity has reached 0.966.

Example 6

A toner and a developer are prepared as in Example 1 except that the releasing agent particle dispersion 2 is used as the releasing agent particle dispersion.

Example 7

A toner and a developer are prepared as in Example 1 except that the releasing agent particle dispersion 3 is used as the releasing agent particle dispersion.

Example 8

A toner and a developer are prepared as in Example 1 except that the polyester resin particle dispersion 2 is used as the polyester resin particle dispersion.

Example 9

A toner and a developer are prepared as in Example 1 except that a heat exchanger (multi-tube type) is used and the mixture is cooled at a rate of 30° C./min by adjusting the flow rate so that the residence time in the heat exchanger is 50 seconds, and then the slurry is discharged into the recovery vessel.

Example 10

A toner and a developer are prepared as in Example 1 except that, after the average circularity has reached 0.966, the mixture is cooled at a rate of 65° C./min by adjusting the flow rate from the 2 L cylindrical stainless steel container 1 so that the residence time in the heat exchanger (spiral type) is 23 seconds, and then the resulting slurry is discharged into the cylindrical stainless steel container 2 (recovery vessel).

Comparative Example 1

A toner and a developer are prepared as in Example 1 except that the mixture is cooled at a rate of 29° C./min by adjusting the flow rate so that the residence time in the heat exchanger (spiral type) is 52 seconds, and then the slurry is discharged into the recovery vessel.

Comparative Example 2

A toner and a developer are prepared as in Example 1 except that the mixture is cooled at a rate of 131° C./min by adjusting the flow rate so that the residence time in the heat exchanger (spiral type) is 11 seconds, and then the slurry is discharged into the recovery vessel.

Comparative Example 3

A toner and a developer are prepared as in Example 1 except that, after the slurry is cooled to 76° C. at a rate of 0.5° C./min, the slurry is cooled to 51° C. or lower by adding 5° C. ion exchange water so that the rate of decreasing the slurry temperature is 20° C./min.

Evaluation of Property of Suppressing Generation of Color Spots

The obtained electrostatic charge image developer is loaded into a developing device of an electrophotographic copier (Docu Centre Color 450 produced by Fuji Xerox Co., Ltd.) from which a fixing device has been removed. Then an unfixed image is output. After leaving the electrophotographic copier containing the developer in a high-temperature, high-humidity environment (temperature of 30° C./relative humidity of 85%) for one day, 10,000 sheets of A4-size regular paper are continuously printed in an environment having a temperature of 30° C. and a relative humidity of 85%. One hundred sheets from the 9,901th to the 10,000th sheets are visually observed, and the property of suppressing occurrence of color spots is evaluated according to the following criteria:

G1: No color spots are observed.

G2: Color spots are observed in one or more but not more than five sheets.

G3: Color spots are observed in six or more sheets.

The evaluation results are all indicated in Table.

TABLE

| | Type of toner | Cooling rate in cooling step (° C./min) | Cooling unit | Slow cooling step | Cooling rate in slow cooling step (° C./min) | Releasing agent Type | Releasing agent Endothermic peak onset temperature (° C.) | Type of polyester resin dispersion | Evaluation of property of suppressing occurrence of color spots |
|---|---|---|---|---|---|---|---|---|---|
| Example 1 | Toner 1 | 65 | Heat exchanger (spiral type) + recovery vessel | Yes | 0.5 | A1 (FNP92) | 81 | P1 | G1 |
| Example 2 | Toner 2 | 30 | Heat exchanger (spiral type) + recovery vessel | Yes | 0.5 | A1 (FNP92) | 81 | P1 | G2 |
| Example 3 | Toner 3 | 130 | Heat exchanger (spiral type) + recovery vessel | Yes | 0.5 | A1 (FNP92) | 81 | P1 | G2 |
| Example 4 | Toner 4 | 65 | Heat exchanger (spiral type) + recovery vessel | Yes | 0.1 | A1 (FNP92) | 81 | P1 | G2 |
| Example 5 | Toner 5 | 65 | Heat exchanger (spiral type) + recovery vessel | Yes | 1.0 | A1 (FNP92) | 81 | P1 | G2 |
| Example 6 | Toner 6 | 65 | Heat exchanger (spiral type) + recovery vessel | Yes | 0.5 | A2 (PW725) | 82 | P1 | G1 |
| Example 7 | Toner 7 | 65 | Heat exchanger (spiral type) + recovery vessel | Yes | 0.5 | A3 (HNP9) | 67 | P1 | G1 |
| Example 8 | Toner 8 | 65 | Heat exchanger (spiral type) + recovery vessel | Yes | 0.5 | A1 (FNP92) | 81 | P2 | G1 |
| Example 9 | Toner 9 | 65 | Heat exchanger (multi-tube type) + recovery vessel | Yes | 0.5 | A1 (FNP92) | 81 | P1 | G2 |
| Example 10 | Toner 10 | 65 | Heat exchanger (spiral type) + recovery vessel | No | — | A1 (FNP92) | 81 | P1 | G2 |
| Comparative Example 1 | Toner 11 | 29 | Heat exchanger (spiral type) + recovery vessel | Yes | 0.5 | A1 (FNP92) | 81 | P1 | G3 |
| Comparative Example 2 | Toner 12 | 131 | Heat exchanger (spiral type) + recovery vessel | Yes | 0.5 | A1 (FNP92) | 81 | P1 | G3 |
| Comparative Example 3 | Toner 13 | 20 | Addition of water + recovery vessel | Yes | 0.5 | A1 (FNP92) | 81 | P1 | G3 |

These results show that, a toner for developing an electrostatic charge image, the toner having an excellent property of suppressing occurrence of color spots is obtained in the Examples compared to the Comparative Examples.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A method for producing a toner for developing an electrostatic charge image, comprising:

aggregating at least resin particles and releasing agent particles contained in a dispersion to form aggregated particles;

heating and fusing the aggregated particles to prepare a dispersion containing fused particles; and cooling the dispersion containing the fused particles to a temperature equal to or lower than a temperature 30° C. lower than an endothermic peak onset temperature derived from a releasing agent that constitutes the releasing agent particles, wherein, in the cooling, the dispersion is cooled at a rate of 50° C./min or more and 80° C./min or less using a spiral heat exchanger, and further comprising, after the fusing and before the cooling, slow cooling the dispersion containing the fused particles to a temperature equal to or lower than a temperature 3° ° C. lower than the endothermic peak onset temperature derived from the releasing agent at a rate of 0.2° C./min or more and 0.8° C./min or less, wherein the releasing agent is a paraffin wax or a hydrocarbon wax, and the resin particles in the aggregation step are polyester resin particles.

2. The method for producing a toner for developing an electrostatic charge image according to claim 1, wherein the method uses an apparatus equipped with an aggregation and coalescence vessel where the aggregating and the fusing are performed, a heat exchanger that performs the cooling, and a recovery vessel that recovers the cooled toner particle dispersion.

3. The method for producing a toner for developing an electrostatic charge image according to claim 1, wherein, in the cooling, the temperature of the dispersion containing the fused particles is decreased by 10° C. or more and 50° C. or less.

4. The method for producing a toner for developing an electrostatic charge image according to claim 3, wherein, in the cooling, the temperature of the dispersion containing the fused particles is decreased by 20° ° C. or more and 30° C. or less.

5. A toner for developing an electrostatic charge image, the toner being obtained by a method for producing a toner for developing an electrostatic charge image according to claim 1.

6. The method for producing a toner for developing an electrostatic charge image according to claim 1, wherein a volume average particle diameter of the releasing agent particles before aggregation dispersed in the dispersion is 0.01 μm or more and 1 μm or less.

7. The method for producing a toner for developing an electrostatic charge image according to claim 1, wherein in the aggregation step, a solid component concentration of the dispersion is 5 mass % or more and 30 mass % or less.

8. The method for producing a toner for developing an electrostatic charge image according to claim 1, wherein the releasing agent has a melting temperature of 50° C. or higher and 110° C. or lower.

9. The method for producing a toner for developing an electrostatic charge image according to claim 1, wherein a volume average particle diameter of the resin particles before aggregation dispersed in the dispersion is 0.01 μm or more and 1 μm or less.

10. The method for producing a toner for developing an electrostatic charge image according to claim 1, wherein the resin particles in the aggregation step contain amorphous resin particles and crystalline resin particles.

11. The method for producing a toner for developing an electrostatic charge image according to claim 1, wherein the resin particle dispersion is prepared by dispersing the resin particles in a dispersion medium with a surfactant.

* * * * *